Feb. 7, 1961 A. H. BOBECK 2,971,098

MAGNETIC CORE CIRCUIT

Filed Dec. 18, 1956

INVENTOR
A. H. BOBECK
BY
ATTORNEY 2,971,098
Patented Feb. 7, 1961

2,971,098

MAGNETIC CORE CIRCUIT

Andrew H. Bobeck, Chatham, N.J., assignor to Bell Telephone Laboratories, Incorporated, New York, N.Y., a corporation of New York Filed Dec. 18, 1956, Ser. No. 629,132

9 Claims. (Cl. 307—88)

Figure 1:
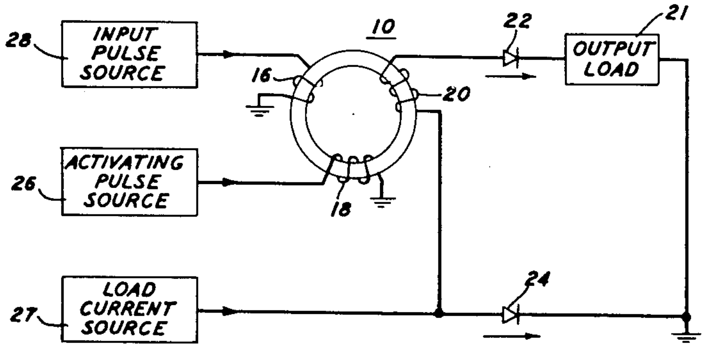

This invention relates to electrical circuits and more particularly to electrical circuits employing magnetic cores.

Many types of electrical circuits present a generalized switching problem in which it is desired to direct a current pulse to one of a number of possible loads, the particular load being determined by information priorly stored either in the circuit or associated circuits. Various types of circuits have been developed to resolve this problem including magnetic cores having substantially rectangular hysteresis loops.

One type of pulse switching circuit utilizing magnetic cores is disclosed in M. Karnaugh Patent 2,719,961, issued October 4, 1955. This type of circuit comprises a plurality of magnetic cores, each having a plurality of windings thereon, including an input winding, an activating winding, and an output winding. The activating windings are connected in series to an activating pulse source. The output windings are connected in an output network containing a plurality of electrical paths, one end of the network being connected to the last of the series activating windings.

A core is considered as set when its magnetization is determined in one direciton, and is considered as reset when its magnetization is switched to the other direction. Each core in the network is either set by pulses in its input windings or else remains in the reset condition, according to the applied input information. Application of the activating pulse to the activating winding has the effect of resetting those cores which have been priorly set, thereby inducing a forward electromotive force in each of the output windings of priorly set cores. The presence of such a forward electromotive force in any of the electrical output paths permits the activating current to flow only through that path. The circuit may advantageously be constructed such that all paths but one are blocked. In this manner, an output pulse appears only at the load connected to an unblocked path.

It is an object of this invention to provide improved pulse switching circuits employing magnetic cores.

It is another object of this invention to reduce the power requirement of magnetic core switching circuits and more specifically to reduce the activating pulse power and size of core windings required by such circuits.

It is still another object of this invention to improve the output current waveform of magnetic core switching circuits.

In accordance with one aspect of this invention, the output windings of the magnetic cores are connected to an independent voltage source, and one end of the serially connected activating windings is grounded rather than connected to the output network. The output network is so constructed that all cores which are set by any possible combination of input pulses will have output windings each of which lie on a distinct output path. Then, on application of the activating pulse, current from the independent voltage source will flow through that path to the exclusion of all others.

Unidirectional current elements are connected in each of the output paths in such a manner as to prevent undesirable induced currents from flowing when any of the cores are set or reset. Thus, only the current from the independent voltage source, triggered by the action of the activating pulse in resetting a core, will flow in the output network and to the desired load. Further, a unidirectional current element is advantageously connected in parallel with the output network so that the current from the independent voltage source is shunted through this element to ground after the priorly set cores have been reset or in the case when no cores have been priorly set.

A forward electromotive force is developed across the output winding of a given priorly set core by the activating current pulse, as described hereinbefore. The current flowing in the output winding from the independent voltage source tends to oppose the necessary resetting of the core by the activating winding. As the resetting of the core is required to induce the forward electromotive force in the output winding of the priorly set core, and thus to give rise to the selective switching operation of the circuit, it is necessary that the magnetomotive force tending to reset the core be larger than the magnetomotive force tending to set the core, so that there will be a net magnetomotive force which causes the core to be reset and pulse switching to occur. Because the current through both the activating winding and the output winding of a priorly set core is substantially the same in the circuit of the cited Karnaugh patent, this net magnetomotive force is attained by providing the activating winding with more turns than the output winding. The activating current then will provide the load current. Economic considerations dictate that the core cross-sectional area and the number of turns used in the core windings be held to a minimum, so that it is important that the gating function of the core be used to its utmost by having the voltage induced in the output winding just equal the voltage drops in the load loop. It is often difficult to adjust the winding ratio so as to achieve this objective. Also, the voltage generated by a typical core switching under constant-current drive rises gradually to its peak, thus wasting an appreciable fraction of the magnetomotive force available to produce output current.

In accordance with this invention, connection of the output winding to an independent voltage source and grounding of the activating winding permits the activating pulse to act as a trigger in gating current from the independent source to the load, thus overcoming the disadvantages described hereinbefore. The independent voltage source is also connected to ground such that current from this source will normally be shunted to ground and thus fail to affect the load. The output winding is designed such that the voltage rise developed across the output winding during switching of the core in a selected direction will exceed the voltage drop caused by flow of current through the output diode and the load. In this fashion substantially all of the current from the source will pass through the output winding during development of a forward electromotive force therein.

It is a feature of this invention that an electrical circuit comprise a number of magnetic cores each having input, activating, and output windings, the activating windings being connected in series and to ground and the output windings being connected in an output winding network defining a plurality of paths connected to a voltage source, the output windings being wound on their cores so that a forward electromotive force is induced thereacross on resetting of the cores.

It is another feature of this invention that a pulse switching circuit comprise magnetic cores having their output windings so wound as to develop forward electromotive forces thereacross on resetting of the cores and pass current from an independent voltage source to the load, input pulses being applied to the input windings of these cores to set only those cores at whose output windings an output pulse is desired.

Figure 2:
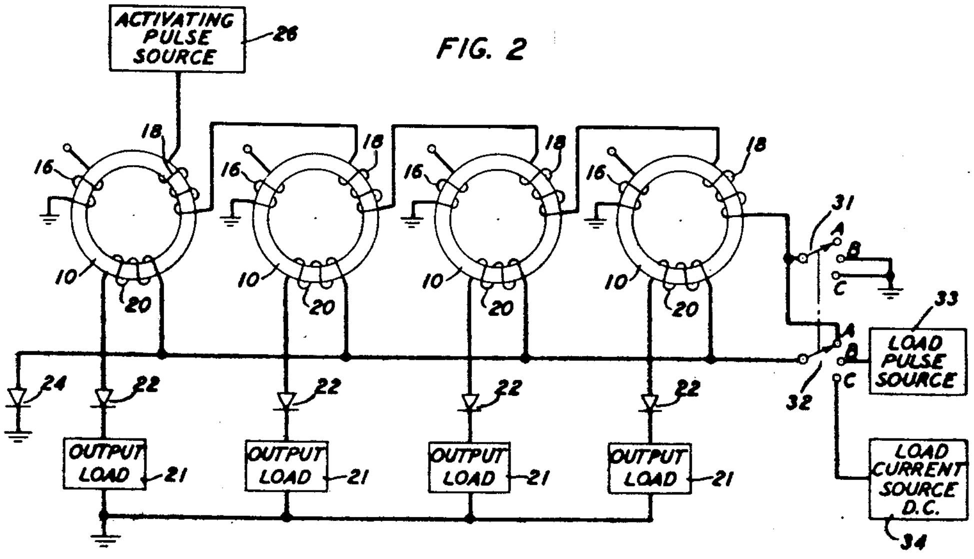

A complete understanding of this invention and of these and other features of this invention may be gained from consideration of the following detailed description and the accompanying drawing in which:

Fig. 1 is a schematic representation of a pulse switching circuit in accordance with one specific illustrative embodiment of this invention; and Fig. 2 is a schematic representation of a pulse steering circuit utilizing a plurality of pulse switching circuits in accordance with the embodiment disclosed in Fig. 1.

Turning now to Fig. 1, the embodiment of the invention there depicted comprises a magnetic core 10 being of a material having a substantially rectangular hysteresis loop. A plurality of windings is placed on the core including an input winding 16, an activating winding 18, and an output winding 20. An output load 21 is connected to the output winding through a unidirectional current element, such as a diode 22. This diode prevents current from flowing in the output winding 20 when the core 10 is being set and assures current flow in the output winding when a forward electromotive force is being induced therein.

One end of the activating winding 18 is connected to an activating pulse source 26 and the other end is connected directly to ground. A load current source 27 is connected in series with the paralleled combination of the output winding 20 and another unidirectional current element or diode 24, which is connected directly to ground. Diode 24 prevents spurious signals from flowing through the output winding 20 and the load 21 which may tend to operate the core erroneously or to provide a false indication to the load.

An appreciation of various of the novel features of this invention may be gained from a description of the operation of this particular embodiment thereof which is a pulse switching circuit for delivering an output pulse to the output load 21 depending on the input pulse applied by source 28 to the input winding 16. A pulse of one polarity from source 28 through winding 16 tends to set the core 10 by magnetizing the core in one direction, for example clockwise, as shown in Fig. 1, while a pulse of opposite polarity through winding 16 tends to oppose setting the core by magnetizing the core in the opposite direction. The activating winding 18 is wound on the core so that the activating current tends to reset the core; i.e., magnetize the core in this example in a clockwise direction as indicated in Fig. 1. The output winding 20 is wound on the core so that the electromotive force developed thereacross on application of the activating pulse, if the core had been priorly set by the application of the appropriate input pulse to the input winding 16, is in a forward direction; i.e., in the direction of the current from the load current source 27. This induced electromotive force therefore serves to draw the load current through the output winding.

Thus if an output pulse is to be switched to the load 21 connected to the output winding 20 of core 10, an appropriate input pulse to set the core is applied to the input winding 16; i.e., magnetize the core in a counterclockwise direction. Now on application of the activating pulse from source 26 through winding 18, the core is reset, creating a change of flux sufficient to induce an electromotive force in output winding 20 in a direction to draw the load current from source 27 therethrough.

Diode 22 prevents current from flowing through the load circuit 21 due to the application of input pulses. Diode 24, which is directly connected to ground potential, assures that the load current will flow through this path rather than the output winding and load after the priorly set core has been reset. The load current therefore flows through the output winding of the core only while the core is being reset and thus only while a forward electromotive force is being induced across the output winding.

The load current flowing through the output winding creates a magnetomotive force tending to set the core; i.e., opposing the resetting of the core by the magnetomotive force developed by the current flowing through the activating winding 18. In order to properly carry out the pulse switching operation, it is necessary that the net electromotive force in the core be sufficient to reset the core. Thus the magnetomotive force developed in the activating winding must be greater than that required to reset the core by the amount of this opposing magnetomotive force developed in the output winding. This requirement is satisfied in the circuit of the Karnaugh patent cited hereinbefore by increasing the turns on the activating winding in relation to the turns on the output winding. The flexibility of the circuit, in accordance with this invention, permits satisfaction of this requirement by suitable adjustment of the activating current, the number of turns on the activating winding 18, the load current or the number of turns on the output winding 20.

Further, in accordance with this invention, a load current source distinct from the activating current source permits employment of a direct current source for the load current. The activating current, in this instance, merely provides the timing for passage of the load current through the output winding. The load current amplitude is not restricted by the activating pulse source and may be varied so long as the net electromotive force in the core during the activating pulse interval is sufficient to reset the core. The rectangularity of the output pulse is improved measurably over an output pulse attained by switching the activating current to the load as in the patent to M. Karnaugh cited hereinbefore, since the direct current from the load current source 27 may be completely switched by action of the activating current long before the activating current has reached its maximum value.

Turning now to Fig. 2 there is depicted a plurality of the magnetic core circuits illustrated in Fig. 1 arranged to form a selective network which permits selection of one of many possible loads. Four magnetic cores 10 are shown. The activating windings 18 are connected in series with the activating pulse source 26 and the switch 31. The paralleled combination of the output windings 20 and diode 24 is connected to the switch 32.

With switches 31 and 32 in position A, the series of activating windings is connected to each load winding 20 and the diode 24, providing the operation described in the patent to M. Karnaugh cited hereinbefore. In this instance a set core 10 will draw the activating current through the associated output winding 20 with the consequent problems arising from utilizing the same current through both windings to establish the net electromotive force required to reset the core as discussed hereinbefore.

Greater flexibility is achieved in accordance with this invention, by placing the switches 31 and 32 in positions B or C, which grounds the activating windings and connects an independent load pulse source 33 or direct current source 34, respectively, to the output windings 20. This permits design of the core circuits so as to obtain exactly the net electromotive force required to reset the core with consequent economies realized in windings and power requirement.

Also, the amplitude of the load current is no longer restricted by the activating current. If the match between the activating pulse source and the load is not satisfactory, the transforming property, in accordance with this aspect of the invention, may be utilized to correct the mismatch.

The electromotive force produced in resetting the core increases gradually to its peak value. Thus with the switches 31 and 32 in position A, the full value of activating current is switched to the load only during a small portion of the resetting interval. With the switches 31 and 32 in positions B or C, however, the load current may be completely switched long before the electromotive force has reached its peak value.

Now in operation, each of the cores 10 is placed in the set condition or remains in the reset condition in accordance with the pulses received in input windings 16. Upon establishment of the condition of each core, a current pulse applied to each activating winding 18 resets all preset cores and draws the load current from sources 33 or 34 through the output windings of those cores and to their respective loads 21. Thus, only one core need be set, by appropriate input pulses, and then reset by the activating pulse, in order to switch the pulse to an output circuit. The output pulse flows only in the network path including output windings of each of the priorly set cores.

It is to be understood that the above-described arrangements are illustrative of the application of the principles of the invention. Numerous other arrangements may be devised by those skilled in the art without departing from the spirit and scope of the invention.

What is claimed is:

1. An electrical circuit comprising a magnetic core, an input winding, an activating winding and an output winding on said core, load means connected in series with said output winding, a source of load current connected to said output winding, means connecting said load current source to ground, means including said input winding to determine the magnetization of said core in one direction, a distinct current source, and means for applying an activating pulse from said distinct current source to said activating winding to determine the magnetization of said core in the other direction, said output winding being wound on said core so as to develop an electromotive force thereacross to draw current from said load current source through said output winding to said load means during the determination of said magnetization in said other direction.

2. An electrical circuit in accordance with claim 1 wherein said load current source is a source of direct current.

3. An electrical circuit in accordance with claim 1 wherein said means connecting said load current source to ground comprises a unidirectional current element.

4. An electrical circuit in accordance with claim 1 further comprising a unidirectional current element connected between said output winding and said load means and poled to permit current flow in said load means from said load source through said output winding.

5. An electrical circuit comprising a plurality of magnetic cores, a plurality of windings on each of said cores including an input winding, an activating winding, and an output winding, means connecting said activating windings in series, a current source, means connecting said current source to ground, means connecting said output windings in a network of parallel paths and to said current source, load means connected in series with each of said output winding paths, means including an input winding for determining the magnetization of a core in one direction, a second current source, and means for applying an activating pulse from said second current source to said activating windings in series to determine the magnetization of said core in the other direction, said output windings being wound on said cores to develop a forward electromotive force thereacross during the reversal of the direction of magnetization of said priorly set core whereby current from said current source flows through said output winding of said priorly set core.

6. An electrical circuit comprising a plurality of magnetic cores, a plurality of windings on each of said cores, said windings including an input winding, an activating winding and an output winding, means connecting said output windings in a network comprising a plurality of electrical paths, load means connected to each of said paths, a load current source connected to said output windings, means shunting said load current source to ground, means including said input windings for determining the magnetization of certain of said cores in one direction, an activating current source distinct from said load current source, and means including said activating windings and said activating current source for determining the magnetization of said certain cores in the other direction, said output windings being wound on said cores to develop an electromotive force thereacross during the magnetization of said certain cores in said other direction whereby a load current pulse flows only in the network path including output windings of said certain cores.

7. An electrical circuit in accordance with claim 6 wherein said load current source is a source of direct current.

8. An electrical circuit in accordance with claim 6 and further comprising a unidirectional current element in series with each of said output windings and poled to prevent passage of current therethrough due solely to induced electromotive forces.

9. An electrical circuit comprising a plurality of magnetic cores, an input winding, an activating winding and an output winding on each of said cores, means connecting said output windings in a network comprising a plurality of electrical paths, a source of steady state current connected to said output windings and to ground, means including said input windings for reversing the state of magentization of certain of said cores, a second source of current connected to said activating windings, and means for applying current from said second source to said activating windings for restoring the initial state of magnetization in said certain cores, said output windings being wound on said cores to induce a forward electromotive force therein during restoration of said initial state of magnetization permitting current from said steady state current source to flow in said electrical paths connected to output windings of said certain cores.

References Cited in the file of this patent

UNITED STATES PATENTS

| | | |
|---|---|---|
| 2,519,513 | Thompson | Aug. 22, 1950 |
| 2,719,773 | Karnaugh | Oct. 4, 1955 |
| 2,719,961 | Karnaugh | Oct. 4, 1955 |
| 2,719,962 | Karnaugh | Oct. 4, 1955 |
| 2,800,596 | Bolie | July 23, 1957 |
| 2,802,202 | Lanning | Aug. 6, 1957 |